United States Patent
Burrowes et al.

(10) Patent No.: US 12,555,610 B2
(45) Date of Patent: Feb. 17, 2026

(54) TECHNIQUES OF COORDINATING SENSORY EVENT TIMELINES OF MULTIPLE DEVICES

(71) Applicant: Harmonix Music Systems, Inc., Boston, MA (US)

(72) Inventors: Paul Burrowes, Woburn, MA (US); Christopher McCarthy, Braintree, MA (US)

(73) Assignee: Epic Games, Inc., Cary, NC (US)

( * ) Notice: Subject to any disclaimer, the term of this patent is extended or adjusted under 35 U.S.C. 154(b) by 466 days.

(21) Appl. No.: 17/981,966

(22) Filed: Nov. 7, 2022

(65) Prior Publication Data

US 2023/0146585 A1 May 11, 2023

Related U.S. Application Data

(60) Provisional application No. 63/277,912, filed on Nov. 10, 2021.

(51) Int. Cl.
| | |
|---|---|
| *G06K 9/00* | (2022.01) |
| *G06V 20/40* | (2022.01) |
| *G11B 27/10* | (2006.01) |
| *G11B 27/031* | (2006.01) |

(52) U.S. Cl.
CPC ............. *G11B 27/10* (2013.01); *G06V 20/44* (2022.01); *G11B 27/031* (2013.01)

(58) Field of Classification Search
CPC ................... A63F 13/424; A63F 13/814; A63F 2300/8047
See application file for complete search history.

(56) References Cited

U.S. PATENT DOCUMENTS

| | | | |
|---|---|---|---|
| 8,371,940 B1* | 2/2013 | Robinson | A63F 13/46 463/40 |
| 8,814,687 B1* | 8/2014 | Robinson | A63F 13/843 463/40 |
| 2007/0140510 A1 | 6/2007 | Redmann | |
| 2010/0009750 A1* | 1/2010 | Egozy | A63F 13/335 463/35 |
| 2011/0028218 A1* | 2/2011 | Gomes | G09B 15/00 463/39 |
| 2012/0053710 A1* | 3/2012 | Lindahl | G11B 20/10 704/500 |

(Continued)

OTHER PUBLICATIONS

International Search Report and Written Opinion mailed Mar. 14, 2023 for International Application No. PCT/US2022/049112.

(Continued)

*Primary Examiner* — Hadi Akhavannik
(74) *Attorney, Agent, or Firm* — Wolf, Greenfield & Sacks, P.C.

(57) ABSTRACT

Embodiments described herein relate to techniques of coordinating sensory event timelines of multiple devices. The devices may use the sensory even timelines to output sensory events such as audio segments. The devices may take turns determining the sensory events to be output by the devices using their sensory event timelines. The techniques coordinate transitions of the devices between a first mode in which a device is allowed to determine sensory events to be output and a second mode in which a device outputs sensory events determined by another device.

24 Claims, 9 Drawing Sheets

(56) References Cited

U.S. PATENT DOCUMENTS

| | | | |
|---|---|---|---|
| 2012/0071238 A1* | 3/2012 | Bala | A63F 13/814 |
| | | | 463/31 |
| 2012/0132057 A1 | 5/2012 | Kristensen | |
| 2013/0152767 A1* | 6/2013 | Katz | A63F 13/814 |
| | | | 84/616 |
| 2015/0215715 A1* | 7/2015 | Sheen | H04R 27/00 |
| | | | 381/77 |
| 2017/0056772 A1* | 3/2017 | Eng | A63F 13/54 |
| 2018/0288467 A1 | 10/2018 | Holmberg et al. | |
| 2020/0051460 A1* | 2/2020 | Bedor | G09B 19/22 |

OTHER PUBLICATIONS

[No Author Listed] Introducing Patchwork: devices for original music creation and rhythmic gameplay in Fortnite. Nov. 3, 2023. https://create.fortnite.com/news/introducing-patchwork-devices-for-original-music-creation-and-rhythmic-gameplay-in-fortnite?team=personal. [last accessed Feb. 7, 2025]. 6 pages.

[No Author Listed] Create in Fortnite Build games and experiences to publish to millions of Fortnite players. https://www.fortnite.com/create?lang=en-US. [last accessed Feb. 7, 2025]. 3 pages.

[No Author Listed] Build in Fortnite Unreal Editor for Fortnite (UEFN) is here to empower creators to build experiences and publish them directly into Fortnite using the power of the Unreal Editor. https://dev.epicgames.com/community/fortnite/getting-started/uefn. [last accessed Feb. 7, 2025]. 2 pages.

U.S. Appl. No. 18/904,690, filed Oct. 2, 2024, Burrowes et al.

\* cited by examiner

TECHNIQUES OF COORDINATING SENSORY EVENT TIMELINES OF MULTIPLE DEVICES

RELATED APPLICATIONS

This Application claims priority under 35 U.S.C. § 119(e) to U.S. Provisional Application Ser. No. 63/277,912, titled "TECHNIQUES OF COORDINATING SENSORY EVENT TIMELINES OF MULTIPLE DEVICES," filed on Nov. 10, 2021, which is herein incorporated by reference in its entirety.

FIELD

Described herein are techniques of coordinating sensory event timelines of multiple different devices that are configured to determine sensory events for output using the sensory event timelines. In particular, the techniques coordinate transitioning of each device between a first mode in which the device is allowed to determine sensory events to be output by the devices using their sensory event timelines and a second mode in which the device outputs sensory events determined by another one of the devices.

BACKGROUND

A multi-party videogame can involve multiple users using different devices to determine content for the videogame. For example, a multi-party videogame may involve users working together to create music. In this example, each user may have a turn as a performer in which the user determines audio segments that will form the music for a period of time. When one user's turn as the performer ends, another user may become the performer and begin determining audio segments for the music. The multi-party videogame session may proceed in this manner until the end of a session of the videogame.

SUMMARY

According to some embodiments, a method of coordinating a sensory event timeline of a device of a plurality of devices with sensory event timelines of one or more other devices of the plurality of devices is provided. The plurality of devices are configured to determine sensory events for output using sensory event timelines of the plurality of devices. The method comprises: using a processor of the device to perform: operating in a first mode in which the device is allowed to determine sensory events to be output by the plurality of devices using their sensory event timelines; determining to transition from the first mode to a second mode in which the device is to output, using the sensory event timeline, sensory events determined by a first one of the one or more other devices; and after determining to transition from the first mode to the second mode: outputting, using the sensory event timeline, a first interlude to delay output of the sensory events determined by the first device; and after outputting the first interlude, outputting, using the sensory event timeline, the sensory events determined by the first device.

According to some embodiments, the method further comprises: while operating in the second mode, receiving, from the computer system, determining to output sensory events determined by a second device of the one or more other devices instead of the first device; and after determining to output the sensory events determined by the second device: outputting, using the sensory event timeline, a second interlude that is shorter than the first interlude to delay output of the sensory events determined by the second device; and after outputting the second interlude, outputting, using the sensory event timeline, the sensory events determined by the second device.

According to some embodiments, the method further comprises: while operating in the second mode, determining to transition from the second mode back to the first mode in which the device is allowed to determine the sensory events to be output by the plurality of devices using their sensory event timelines; and after determining to transition from the second mode to the first mode: outputting, using the sensory event timeline, the sensory events determined by the device.

According to some embodiments, a device is provided. The device is among a plurality of devices configured to determine sensory events for output using sensory event timelines of the plurality of devices. The device comprises: a processor; and a non-transitory computer-readable storage medium storing instructions that, when executed by the processor, cause the processor to perform: operating in a first mode in which the device is allowed to determine sensory events to be output by the plurality of devices using their sensory event timelines; determining to transition from the first mode to a second mode in which the device is to output, using a sensory event timeline of the device, sensory events determined by a first device of one or more other devices of the plurality of devices; and after determining to transition from the first mode to the second mode: outputting, using the sensory event timeline, a first interlude to delay output of the sensory events determined by the first device; and after outputting the first interlude, outputting, using the sensory event timeline, the sensory events determined by the first device.

According to some embodiments, the instructions further cause the processor to perform: while operating in the second mode, receiving from the computer system, determining to output sensory events determined by a second device of the one or more other devices instead of the first device; and after determining to output the sensory events determined by the second device: outputting, using the sensory event timeline, a second interlude that is longer than the first interlude to delay output of the sensory events determined by the second device; and after outputting the second interlude, outputting, using the sensory event timeline, the sensory events determined by the second device.

According to some embodiments, the instructions further cause the processor to perform: while operating in the second mode, determining to transition from the second mode back to the first mode in which the device is allowed to determine the sensory events to be output by the plurality of devices using their sensory event timelines; and after determining to transition to the first mode: outputting, using the sensory event timeline, the sensory events determined by the device.

According to some embodiments, a non-transitory computer-readable storage medium storing instructions is provided. The instructions, when executed by a processor, cause the processor to perform a method of coordinating a sensory event timeline of a device of a plurality of devices with sensory event timelines of one or more other devices of the plurality of devices. The plurality of devices are configured to determine sensory event events for output using sensory event timelines of the plurality of devices. The method comprises: operating in a first mode in which the device is allowed to determine sensory events to be output by the plurality of devices using their sensory event timelines;

determining to transition from the first mode to a second mode in which the device is to output, using the sensory event timeline, sensory events determined by a first one of the one or more other devices; and after receiving the first command: outputting, using the sensory event timeline, a first interlude to delay output of the sensory events determined by the first device; and after outputting the first interlude, outputting, using the sensory event timeline, the sensory events determined by the first device.

In some embodiments, determining to transition from one mode (e.g., from the first mode or the second mode) into another mode (e.g., the second mode or the first mode) comprises receiving a command from a computer system (e.g., a server) instructing the device to transition, and performing the transition in response to the command. In some embodiments, determining to transition from one mode into another mode may comprise determining, by the device, to perform the transition (e.g., based on receiving a user input, or determining that one or more conditions are met). In some embodiments, determining to output sensory events determined by a second device instead of a first device may comprise receiving a command from a computer system (e.g., a server), and determining to output sensory events determined by the second device in response to the command. In some embodiments, determining to output sensory events determined by a second device instead of a first device may comprise determining, by the device, to output sensory events determined by the second device instead of the first device (e.g., based on receiving a user input, or determining that one or more conditions are met).

According to some embodiments, a system for coordinating sensory event timelines of a plurality of devices is provided. The plurality of devices are configured to determine sensory events for output using the sensory event timelines. The system comprises: a processor; and a non-transitory computer-readable storage medium storing instructions that, when executed by the processor, cause the processor to perform: transmitting, to a first device, a first command instructing the first device to transition from a first mode, in which the first device is allowed to determine sensory events to be output by the plurality of devices using their sensory event timelines, to a second mode in which the first device is to output sensory events determined by a second device of the plurality of devices, wherein the first command causes the first device to perform: outputting, using a first sensory event timeline of the first device, a first interlude to delay output of the sensory events determined by the second device; and after outputting the first interlude, outputting, using the first sensory event timeline, the sensory events determined by the second device.

According to some embodiments, the instructions further cause the processor to perform: transmitting, to the second device, a second command instructing the second device to transition from the second mode into the first mode in which the second device is allowed to determine sensory events to be output by the plurality of devices using their sensory event timelines, wherein the second command causes the second device to perform: outputting, using a second sensory event timeline of the second device, the sensory events determined by the second device.

According to some embodiments, the instructions further cause the processor to perform: transmitting, to a third one of the plurality of devices operating in the second mode, a third command instructing the third device to output the sensory events determined by the second device instead of the sensory events determined by the first device, wherein the third command causes the third device to perform: outputting, using a third sensory event timeline of the third device, a second interlude that is shorter than the first interlude to delay output of the sensory events determined by the second device; and after outputting the second interlude, outputting, using the third sensory event timeline, the sensory events determined by the second device.

The foregoing is a non-limiting summary.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

DETAILED DESCRIPTION

Figure 1A:
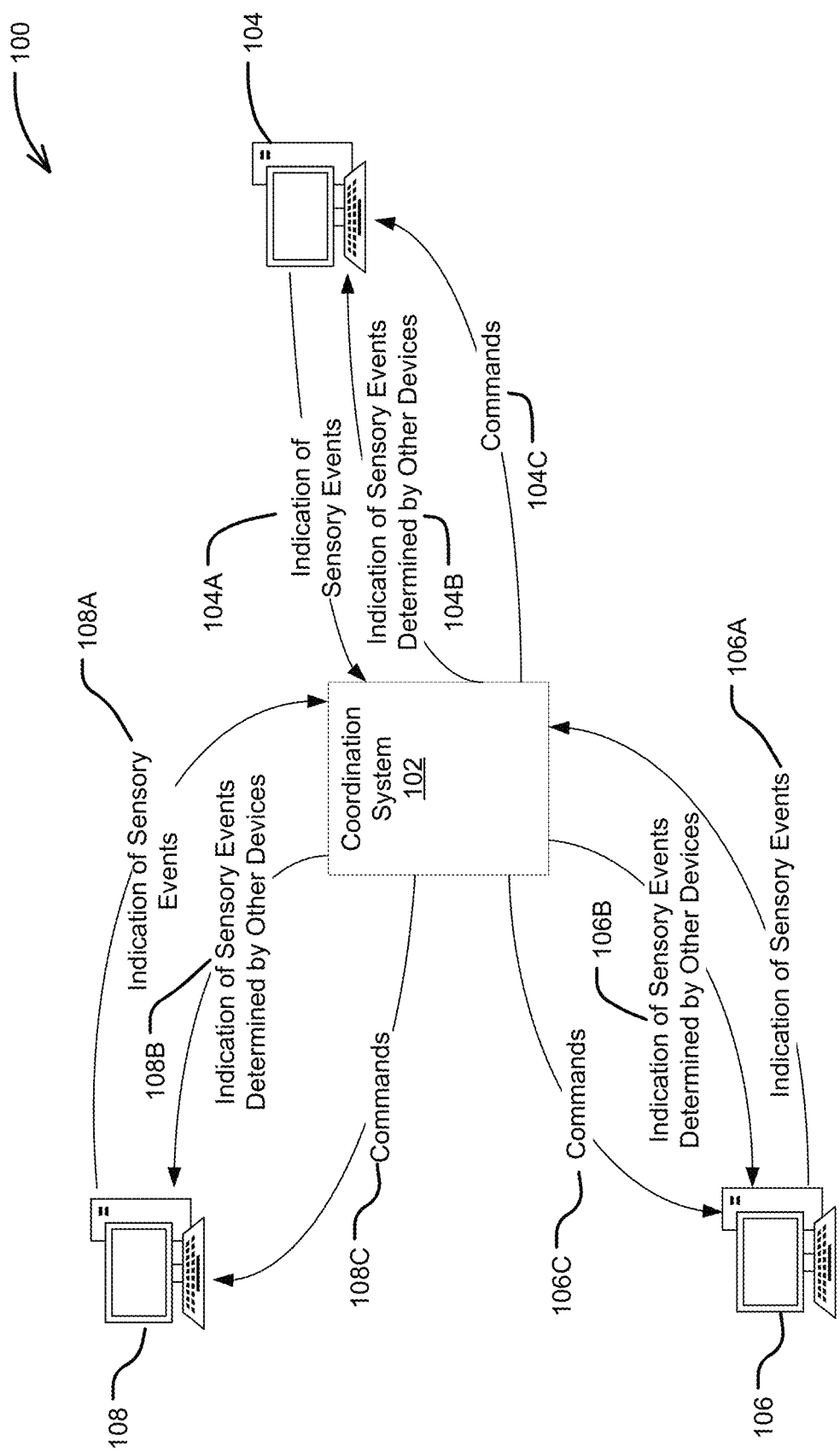
FIG. 1A shows a diagram of an example system in which some embodiments of the technology described herein may be implemented.

There are collaborative multi-party systems in which users using different devices work together to create live sensory content. The sensory content may be audio content (e.g., music), visual content (e.g., video, images), olfactory content (e.g., scents), haptic content (e.g., vibrations), and/or other sensory content. One example of such a collaborative multi-party system is a multiplayer videogame in which multiple players on different devices work together to create music. As an illustrative example, FUSER is a videogame developed by the Harmonix Music Systems Corporation, in which multiple players can collaborate to create live music.

In some collaborative multi-party systems, multiple users may collaborate to create live sensory content by determining sensory events that will make up the sensory content being created. Each device may have its own sensory event timeline (also referred to herein as "timeline") which the device uses to output sensory events. The user devices may take turns being in a first mode (also referred to herein as "creator mode") in which a device is allowed to determine sensory events that are to be output by all the devices using their sensory event timelines. When a device is not in the creator mode, the device may be in a second mode (also referred to as "spectator mode") in which the device outputs sensory events determined by the device in the creator mode. An indication of sensory events determined by the device in the creator mode may be transmitted to the device(s) in the spectator mode for them to output using their respective sensory event timeline(s). In one example multi-party system, a sensory event timeline may be an audio timeline (e.g., a musical timeline) and the users may collaborate to determine audio segments (e.g., vocals, note(s), and/or other audio) to be output using their respective audio timelines. Each user device may have one or more turns in a creator mode in which the device determines audio segments that are to be output using the audio timelines of the devices. Device(s) in a spectator mode may output audio segments determined by the device in the creator mode using their respective audio timelines.

The devices that are interacting in a collaborative multi-party system may be located remotely from one another. As such, information is communicated to the devices through a network (e.g., the Internet). A computer system (e.g., a server) may coordinate all the devices participating in the multi-party system when transitioning devices between the creator mode and the spectator mode. The computer system may further transmit, through the network, indications of sensory events determined by a device in the creator mode to other device(s) in the spectator mode for output using their respective sensory event timelines.

The inventors have recognized that network latency results in undesired effects on a user's experience during such transitions. When the device in the creator mode (also referred to herein as "creator device") determines a sensory event for a point on its sensory event timeline, the device transmits an indication of the determined sensory event to the computer system. The computer system then transmits an indication of the determined sensory event to each device in spectator mode (also referred to herein as "spectator device"). As a result of the network latency, by the time a spectator device receives a communication indicating the sensory event determined by the creator device, the sensory event timeline of the spectator device may have already passed the point for which the sensory event was determined by the creator device. Outputting the sensory event by the spectator device using its sensory event timeline would result in an inaccurate output of the sensory event content, and thus a poor experience for a user of the device. As an illustrative example, where the sensory content is audio content and the devices have respective audio timelines, the network latency may result in an indication of an audio segment determined by a creator device being received by a spectator device after the spectator device's audio timeline has already passed the point for which the audio segment was determined. This delay may result in an undesirable break in output of audio of the spectator device before outputting the audio segment.

A naïve solution may be to simply delay sensory event timelines of spectator devices relative to that of the creator device. However, this solution is not feasible because the devices transition between the creator mode and the spectator mode. As such, the creator device is not always the same device. If the spectator devices' timelines were to simply be delayed relative to a first creator device, the delay would not be maintained when transitioning the first creator device out of the creator mode and one of the spectator devices into the creator mode.

To address the above-described problems, the inventors have developed techniques of coordinating sensory event timelines of different devices that allow transitions of the devices between creator and spectator modes, while mitigating the undesired effects of network latency on user experience of sensory content. Techniques described herein involve outputting interludes using the sensory event timelines when transitioning devices between the creator mode and the spectator mode. An interlude is sensory content for output using a sensory event timeline between two sets of sensory events determined by two different devices. The techniques use the interludes during transitions to re-orient the sensory event timelines such that sensory event timelines of spectator devices are delayed relative to the sensory event timeline of the new creator device to account for network latency. Further, the interludes allow the devices to output desirable sensory content during transitions that improves user experience of the sensory content. As an illustrative example, some embodiments use audio interludes during periods of transition to allow re-orientation of timelines such that spectator devices' timelines are delayed relative to a creator device's audio timeline. Further, the audio interludes may include audio that is enjoyable for a user to listen to, and thus improves the user experience of the sensory content being created (e.g., by eliminating sporadic delays in audio content).

Some embodiments allow a device to coordinate its sensory event timeline with sensory event timelines of one or more other devices that are collaborating to create sensory content (e.g., music). When the device is operating in a creator mode in which it is allowed to determine sensory events (e.g., audio segments) to be output by all the devices using their respective timelines, the device may receive a command from a computer system (e.g., a server) instructing the device to transition from the creator mode to a spectator mode in which it outputs sensory events determined by another device. After the device receives the command, the device may output, using its sensory event timeline, a first interlude to delay output of sensory events output by the other device. The interlude may allow the device to delay its timeline relative to that of the new device entering the creator mode. After outputting the first interlude, the device may output, using its timeline, sensory events determined by the new device in the creator mode.

When a device is operating in the spectator mode in which it outputs sensory events determined by another device, the device may receive a command from a computer system instructing the device to transition into the creator mode. After receiving the command, the device may begin determining sensory events and outputting the sensory events using its timeline. The device may further transmit an indication of its determined sensory events to the computer system so it can inform the other devices of the determined sensory events (i.e., so that the other devices can output the sensory events using their timelines).

When a device is operating in the spectator mode and outputting sensory events determined by a first device, the device may receive a command instructing the device to stop outputting sensory events determined by the first device and begin outputting sensory events determined by a second device. This may be because the first device is transitioning from the creator mode to the spectator mode, and the second device is transitioning from the spectator mode to the creator mode. After receiving the command, the device may output, using its sensory event timeline, an interlude to delay output of the sensory events determined by the second device. The interlude may allow the device's sensory event timeline to be oriented such that it is delayed relative to the sensory event timeline of the second device (i.e., the new creator device). The interlude may further allow the sensory event timeline of the first device (i.e., the previous creator device) to align with that of the device and any other devices operating in the spectator mode. After outputting the interlude, the device may output, using its sensory event timeline, sensory events determined by the second device operating in the creator mode.

Some embodiments may be described herein using an audio timeline as an example sensory event timeline, and audio segments as example sensory events. It should be appreciated that embodiments are not limited to use with audio timelines and audio segments. Embodiments described herein may be used with any sensory event timeline and sensory events. A sensory event timeline may be a visual event timeline (e.g., for use in outputting video segments and/or images), an olfactory event timeline for use in outputting scents for periods of time, a haptic event timeline for use in outputting haptic events (e.g., object movements), a gustatory event timeline for use in outputting gustatory events (e.g., substances of different flavors), and/or any combination thereof. A sensory event may be a visual event (e.g., video and/or image), an olfactory event (e.g., a scent output), a gustatory event (e.g., output of a flavor), a haptic event (e.g., a movement or vibration), and/or any combination thereof.

FIG. 1A shows a diagram of an example system 100 in which some embodiments of the technology described herein may be implemented. As shown in FIG. 1A, the system 100 includes a coordination system 102 in communication with devices 104, 106, 108. Each of the devices 104, 106, 108 has a respective sensory event timeline that it uses to output sensory events. For example, each of the devices 104, 106, 108 may have an audio timeline that the device uses to output audio segments. The devices 104, 106, 108 may take turns operating in a first mode as the creator device that is allowed to determine sensory events to be output by the devices 104, 106, 108 using their timelines. When a device is not operating in the first mode, the device may operate in a second mode as a spectator device that outputs sensory events determined by the creator device. Continuing with the example of the audio timeline, the creator device may determine audio segments to be output by the devices 104, 106, 108 using their timelines, while the spectator devices may output audio segments determined by the creator device. In this example, the devices 104, 106, 108 may collaborate to generate a sequence of audio such as a musical soundtrack.

The coordination system 102 may comprise one or more computing devices. In some embodiments, the coordination system 102 may be a server comprising of one or more computing devices. The server may include storage hardware for storing information. For example, the server may include hard disk drive(s) and/or solid state drive(s) for storing information. In some embodiments, the coordination system 102 may be a video game server which is the source of a multiplayer video game. The server may be configured to communicate with devices 104, 106, 108 connected to the server to allow the devices 104, 106, 108 to maintain their respective versions of a video game. Although the coordination system 102 is shown as a separate system from the devices 104, 106, 108, in some embodiments, one of the devices 104, 106, 108 may also be the coordination system 102. For example, one of the devices 104, 106, 108 may perform functionality of the coordination system 102.

The coordination system 102 communicates with each of the devices 104, 106, 108. As shown in FIG. 1A, the coordination system 102 receives indications of sensory events determined by the devices 104, 106, 108. In some embodiments, the devices 104, 106, 108 may take turns being in a first mode in which a device is allowed to determine sensory events that are to be output by all the devices 104, 106, 108 using their sensory event timelines. The coordination system 102 receives an indication of sensory events determined by the creator device from the creator device. In some embodiments, the indication of the sensory events may be information identifying data to be used to output the sensory events. For example, the indication of the sensory events may be information identifying a file, entry in a database, and/or other data. To illustrate, the coordination system 102 may be a server for a video game, and the indication of sensory events may be information identifying one or more files of the video game storing data for the determined sensory event(s). In some embodiments, the indication of the sensory events may be data to be output by the devices 104, 106, 108 using their sensory event timelines. For example, the indication of the sensory events may be a file storing data to be output by the devices 104, 106, 108 using their sensory event timelines. Continuing with the example of the video game server, and the indication of sensory events may be an indication of video game data that can be used by video game software to output sensory event(s).

The coordination system 102 communicates an indication of sensory events received from the creator device to the other devices. For example, if device 104 is the creator device operating in the first mode, the coordination system 102 may receive an indication of sensory events 104A determined by the device 104 from the device 104, and transmit and indication of the sensory events determined by the device 104 to the spectator devices 106, 108 operating in the second mode. In some embodiments, the indication of sensory events transmitted by the coordination system 102 to the spectator devices may be information identifying data to be used to output the sensory events determined by the creator device. For example, the coordination system 102 may transmit information identifying a file, entry in a database, and/or other data stored on the devices to be used to output the determined sensory events. As an illustrative example, the coordination system 102 may transmit information identifying audio data that is to be used to output a sensory event (e.g., a musical note, vocal, sound effect, and/or other audio segment). In some embodiments, the indication of the sensory events transmitted by the coordination system 102 to the spectator devices may be data to be used to output the sensory events determined by the creator device. For example, the coordination system 102 may transmit a file storing data to be output by the spectator devices.

The coordination system 102 transmits commands to the devices 104, 106, 108 to manage transitions of the devices between the first mode and the second mode. When changing the creator device, the coordination system 102 may: (1) transmit a command to the current creator device instructing it to transition from the first mode into the second mode; and (2) transmit a command to the device that is to become the creator device a command to transition from the second mode into the first mode. The coordination system 102 may further transmit a command to spectator devices that are to remain in the second mode in the transition instructing them to output sensory events determined by the new creator device instead of the previous creator device. In some embodiments, a command transmitted by the coordination system 102 may be software instructions that, when executed by the devices, cause them to perform a transition. Each device may include a software application (e.g., a video game) that executes commands received from the coordination system 102.

The coordination system 102 may be configured to transmit a command to a current creator device instructing it to transition from the first mode into the second mode. When the coordination system 102 transmits a command to a device to transition from the first mode to the second mode, the command, when executed by the device, causes the device to: (1) output an interlude to delay output of sensory events determined by the next creator device; and (2) after outputting the interlude, output, using its sensory event timeline, sensory events determined by the new creator device (e.g., using indications of the determined sensory events sent by the coordination system 102). The interlude allows the sensory event timeline of the device to move from being ahead of sensory event timelines of the other devices to being delayed relative to the sensory event timeline of the new creator device (e.g., to account for undesired effects of network latency).

The coordination system 102 may be configured to transmit a command to a device instructing it to transition from the second mode into the first mode to become the new creator device. When the coordination system 102 transmits a command to a device to transition from the second mode into the first mode, the command, when executed by the device, causes the device to determine sensory events and output the determined sensory events using its sensory event timeline. In some embodiments, the device that transitions into the first mode may be configured to output an interlude using its sensory event timeline prior to outputting the sensory events that it determines. In such embodiments, the interlude outputted by the device may be shorter than the interlude outputted by the previous creator device that transitions into the second mode to allow the sensory event timeline of the previous creator device to be delayed relative to that of the new creator device (e.g., to account for undesired effects of network latency). In some embodiments, the device that transitions into the first model may not output any interlude. In such embodiments, an interlude outputted by the previous creator device using its timeline may allow the device to become delayed relative to the new creator device.

The coordination system 102 may be configured to transmit a command to a spectator device instructing it to stop outputting sensory events determined by a previous creator device, and to begin outputting sensory events determined by a new creator device. The command, when executed by the spectator device, causes the spectator device to: (1) output, using its sensory event timeline, an interlude; and (2) after outputting the interlude, output, using its sensory event timeline, sensory events determined by the new creator device. The interlude outputted by the spectator device may be shorter than an interlude outputted by the previous creator device transitioning into the second mode. This may allow the sensory event timeline of the previous creator device to align with sensory event timelines of the other spectator devices.

In some embodiments, the interlude may comprise one or more sensory events. In some embodiments, the sensory event(s) of an interlude may include one or more sensory events output using a sensory event timeline prior to output of the interlude. For example, the sensory event(s) of the interlude may include one or more final audio segments determined by a previous creator device. In some embodiments, the sensory event(s) of an interlude may include sensory events that are exclusive for use for interludes. For example, the interlude may include audio segment(s) whose output provides a transition sound effect (e.g., audio of a record scratch) that is designated for interludes.

Each of the devices 104, 106, 108 may be a computing device. In some embodiments, the computing device may be a mobile device. For example, the computing device may be a laptop, tablet, smartphone, smartwatch, smart glasses, or other mobile device. In some embodiments the computing device may be a desktop computer. In some embodiments, the computing device may be a video game console. In some embodiments, the devices 104, 106, 108 may be different types of computing devices. For example, the device 104 may be a smartphone, the device 106 may be a desktop computer, and the device 108 may be a laptop.

When any of the devices 104, 106, 108 is operating in the first mode, the device transmits indications of sensory events determined by the device to the coordination system 102. As shown in FIG. 1A, the device 104 transmits an indication of sensory events 104A determined by the device 104 when in the creator mode, the device 106 transmits an indication of sensory events 106A determined by the device 106 when in the creator mode, and the device 108 transmits an indication of sensory events 108A when the device 108 is in the creator mode. When any of the devices 104, 106, 108 is operating in the second mode, the device receives indications of sensory events determined by another device from the coordination system 102. As shown in FIG. 1A, the device 104 receives an indication of sensory events 104B determined by another device while the device 104 is operating in the second mode, the device 106 receives an indication of sensory events 106B determined by another device while the device 106 is operation in the second mode, and the device 108 receives an indication of sensory events 108B determined by another device while the device 108 is operation in the second mode.

As shown in FIG. 1A, the devices 104, 106, 108 are configured to receive commands from the coordination system 102. The device 104 receives commands 104C, the device 106 receives commands 106C, and the device 108 receives commands 108C. In some embodiments, each of the devices 104, 106, 108 may be configured to receive: (1) a first command instructing to transition from the first mode into the second mode; (2) a second command instructing to output sensory events determined by a new creator device; and (3) a third command instructing to transition from the second mode into the first mode.

When one of the devices 104, 106, 108 receives the first command instructing to transition from the first mode into the second, the device may output an interlude to delay output of sensory events determined by another device. After outputting the interlude, the device may output sensory events being determined by the other device. For example, the device may: (1) output an audio interlude using its timeline; and (2) after outputting the audio interlude, output audio segments determined by another device (i.e., the new creator device). The device may receive indications of the sensory events determined by the other device from the coordination system 102.

When one of the devices 104, 106, 108 receives the second command instructing to output sensory events determined by a new creator device, the device may output an interlude to delay output of sensory events determined by the new creator device. After outputting the interlude, the device may output sensory events being determined by the new creator device. For example, the device may: (1) output an audio interlude using its timeline; and (2) after outputting the audio interlude, output audio segments determined by the new creator device. The device may receive indications of the sensory events determined by the new creator device from the coordination system 102.

In some embodiments, the length of the interlude outputted after receipt of the second command may be shorter than the length of the interlude outputted after receipt of the first command. A device that receives the first command may previously have been operating in the first mode in which it was allowed to determine sensory events. As such, sensory event timelines of other devices may be delayed relative to the device. By outputting a longer interlude after receiving the first command than an interlude outputted by devices that were already in the second mode, the sensory event timeline of the device may be delayed such that it approximately aligns with sensory timelines of the other devices operating in the second mode. In some embodiments, the difference between the two interlude lengths may be approximately one sensory event. In some embodiments, the difference between the two interlude lengths may be approximately two, three, four, or five sensory events.

When one of the devices 104, 106, 108 receives the third command instructing to transition from the second mode back into the first mode in which the device is allowed to determine the sensory events to be output by the devices 104, 106, 108, the device may begin outputting sensory events using its sensory event timeline. The device may be configured to transmit an indication of the determined sensory events to the coordination system 102 for transmission to the other devices. Although in the example embodiment of FIG. 1A, the device transmits the indication of determined sensory events to the coordination system 102, in some embodiments, the device may be configured to transmit indications of the determined sensory events to the other devices directly instead of or in addition to the coordination system 102. In some embodiments, the device may be configured to output, using its sensory event timeline, an interlude prior to outputting the sensory events that it detected. In such embodiments, the interlude may be shorter than interludes outputted after receiving the first command or the second command. The shorter interlude may allow the device to move ahead on its sensory event timeline relative to the other devices to mitigate effects of network latency on experience of sensory content on the spectator devices. In some embodiments, the device may be configured to output the determined sensory events without outputting any interlude.

In some embodiments, the communications illustrated in FIG. 1A may occur through a communication network. In some embodiments, the communication network may be the Internet. For example, the devices 104, 106, 108 and the coordination system 102 may be located remotely from one another. The devices 104, 106, 108 may communicate with the coordination system 102 through the Internet. In some embodiments, the communication network may be a local area network (LAN), a wireless network, a wired network, a mobile network, or other suitable communication network. In some embodiments, the communication network may be a network of components within a single device. In such embodiments, each of the devices 104, 106, 108 may be a component within the network of the device.

Although in the example embodiment of FIG. 1A, the transitions of the devices between modes are performed based on commands from the coordination system 102, in some embodiments, the transitions may be performed using other techniques. In some embodiments, one or more of the devices 104, 106, 108 may be configured to determine whether to transition. For example, a creator device may determine when to stop operating in the first mode and transition into the second mode. In another example, the devices 104, 106, 108 may vote to determine whether to change the creator device. In another example, the creator device may transition based on input from a user of the creator device (e.g., indicating to stop operating in the first mode). In some embodiments, a device may programmatically determine whether to perform a transition. For example, the creator device may determine to transition out of the first mode based on determining whether one or more conditions are met. The conditions may, for example, include: operating for a threshold amount of time in the first mode, achieving a particular score or other objective, receiving a threshold number of votes from other users, failing to achieve a particular score or other objective, one of the devices existing a session, and/or other suitable condition(s). In another example, a spectator device operation in a first mode may initiate a transition. The device may initiate a transition based on a user input or based on whether one or more conditions are met.

Figure 1B:
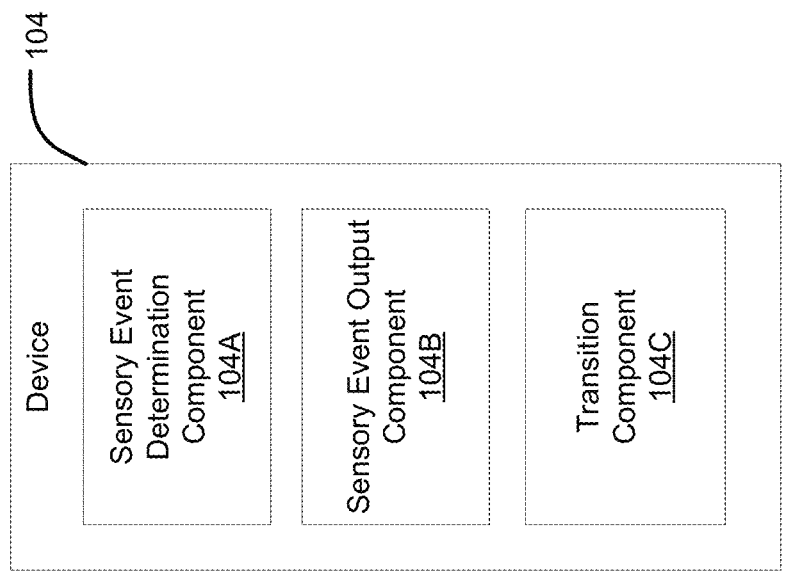
FIG. 1B shows a diagram of an example software components of a device in FIG. 1A, according to some embodiments of the technology described herein.

FIG. 1B shows a diagram of example software components of the device 104 in FIG. 1A, according to some embodiments of the technology described herein. The device 104 includes a sensory event determination component 104A, a sensory event output component 104B, and a transition component 104C. Each of the components 104A, 104B, 104C may be implemented as a set of software instructions stored in memory of the device 104. For example, each of the components 104A, 104B, 104C may be a component of a video game software application.

The sensory event determination component 104A may be configured to determine sensory events that are to be output by the devices 104, 106, 108 using their respective timelines. The sensory event determination component 104A may operate when the device 104 is operating in a first mode as the creator device. In some embodiments, the sensory event determination component 102A may be configured to determine a sensory event based on user input indicating the sensory event. For example, the sensory event determination component 102A may determine a sensory event to be output by receiving a user input indicating a selection of a sensory event from multiple possible sensory events that can be output. To illustrate, the sensory event determination component 104A may provide a user of the device 104 multiple different options for audio segments that can be output in a video game. For example, there may be vocals, sound effects, or other types of audio segments that can be selected by the user. In this example, the sensory event determination component 104A may receive user input selecting indicating selection of one of the audio segments to output at different times on the sensory event timeline. In some embodiments, the sensory event determination component 102A may be configured to program determine sensory events. For example, the sensory event determination component 102A may select sensory events (e.g., audio segments) to be output at different times of a sensory event timeline based on one or more criteria.

The sensory event output component 104B may be configured to output sensory events using a sensory event timeline of the device 104. The sensory event output component 104B may be configured to output sensory events determined by the sensory event determination component 104A and/or sensory events determined by other devices (e.g., indicated by the coordination system 102). The sensory event output component 104B may be configured to output a sensory event using the sensory event timeline by: (1) accessing data for the sensory event; and (2) outputting sensory content using the data at points of the sensory event timeline. For example, the sensory event output component 104B may access a file storing audio data for a sensory event (e.g., an audio segment) and use speakers coupled to the device 104 to output an audio segment at a point of the sensory event timeline. In another example, the sensory event output component 104B may access a file storing image data for a sensory event, and use a display coupled to the device 104 to display an image at a point of the sensory event timeline. In another example, the sensory event output component 104B may access a file storing haptic feedback data for a sensory event, and cause a haptic feedback device to vibrate at a point of the sensory event timeline.

The transition component 104C may be configured to manage transitions the device 104 between the different states of operation. The transition component 104C may be configured to transition of the device 104 between the first mode and the second mode based on commands received from the coordination system 102. The transition component 104C may be configured to transition the device 104 from outputting sensory events determined by one device to outputting sensory events determined by another device based on commands receive from the coordination system 102. The transition component 104C may be configured to use interludes in transitions to orient the sensory event timeline of the device 104 relative to sensory event timelines of the other devices 106, 108 to mitigate effects of network latency. Example techniques for the device 104 to transition between states are described herein with reference to FIGS. 3A-C.

Figure 1C:
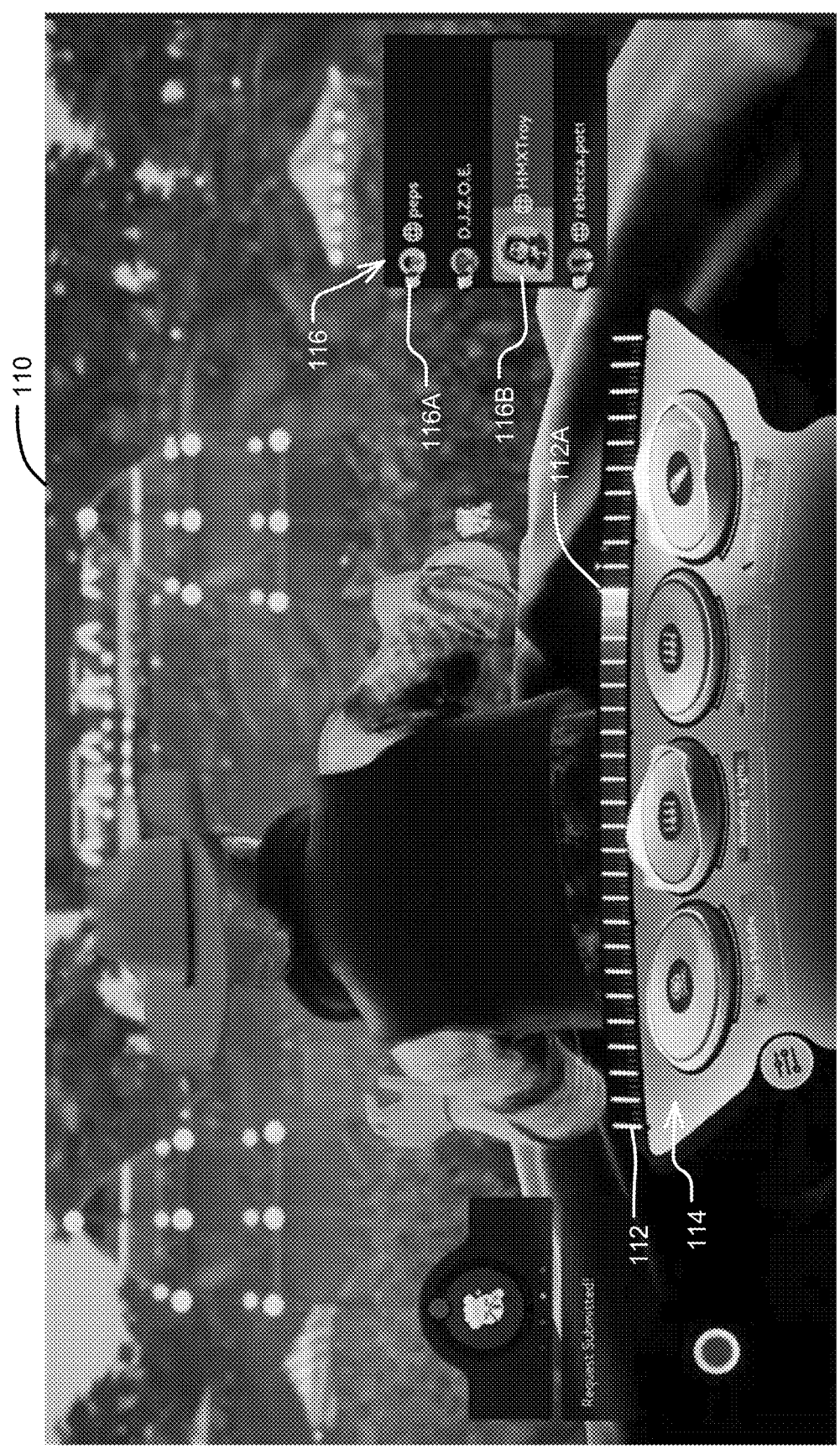
FIG. 1C shows a screenshot of an example graphical user interface (GUI) shown on a device of FIG. 1A, according to some embodiments of the technology described herein.

FIG. 1C shows a screenshot of an example graphical user interface (GUI) 110 shown on a device of FIG. 1A, according to some embodiments of the technology described herein. The GUI 110 is from a videogame in which a user is provided a selection 114 of different audio segments that can be outputted using a sensory event timeline of the device. Graphical element 112 shows a visualization of the sensory event timeline broken into segments marked by the lines. The graphical element 112 includes a visualization 112A of a current position of the user on the timeline. The user may choose from the selection 114 for each segment in the sensory event timeline. The GUI 110 also includes a portion 116 indicating other users that the user is participating with. The users include 116A and 116B. The user 116B is highlighted because that user is currently the creator. The users may take turns determining the audio segments to be output using sensory event timelines of the devices.

Figure 2:
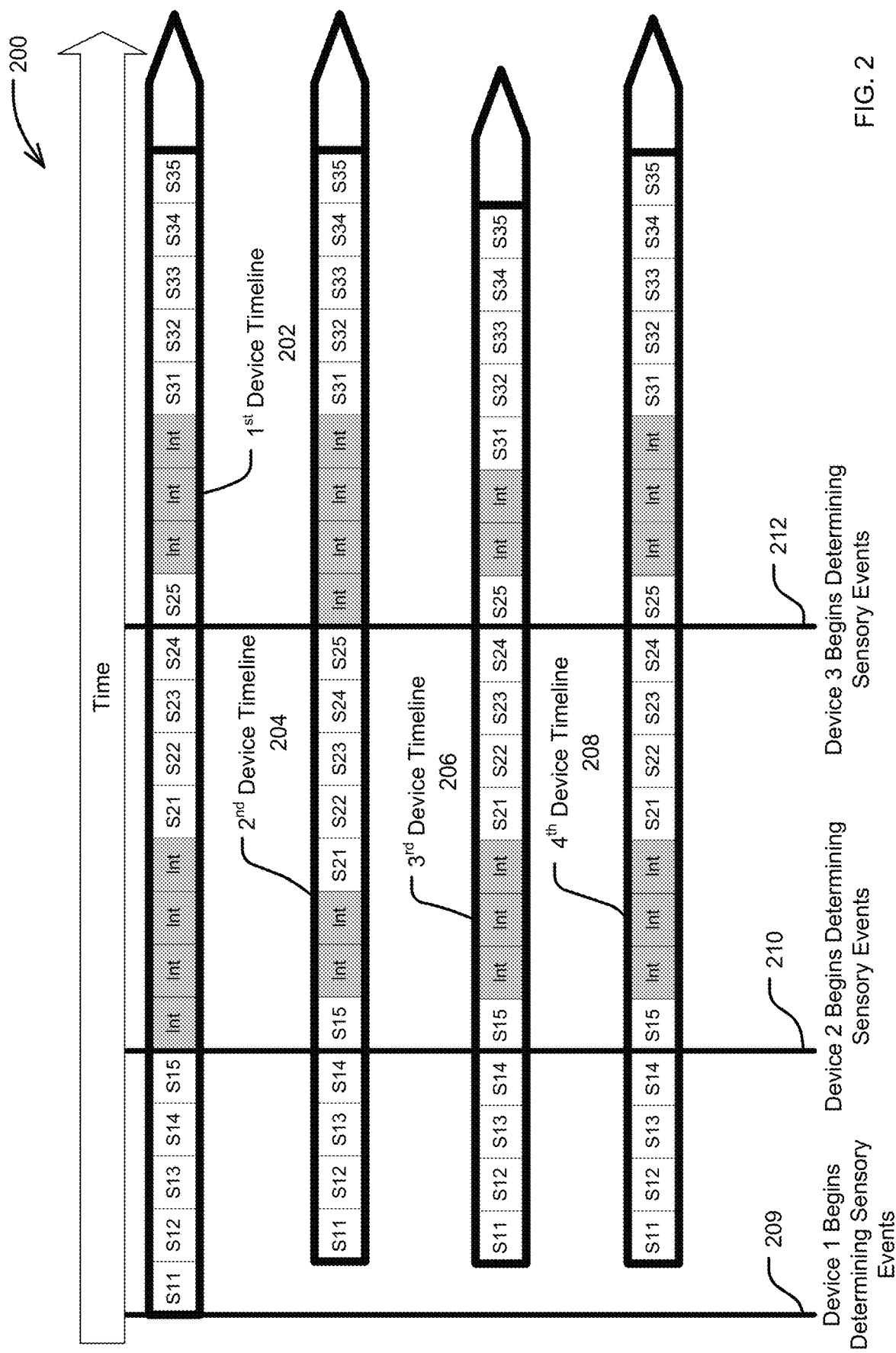
FIG. 2 shows a diagram illustrating sensory event timelines of multiple devices, according to some embodiments of the technology described herein.

FIG. 2 shows a diagram 200 illustrating sensory event timelines of multiple devices, according to some embodiments of the technology described herein. The diagram 200 includes a timeline 202 of a first device, a timeline 204 of a second device, a timeline 206 of a third device, and a timeline 208 of a fourth device. Each timeline includes multiple segments in which sensory events can be output. As an illustrative example, each of the timelines 202, 204, 206, 208 may be audio timelines of the devices. In this example, an audio segment may be output as sensory event in each segment of the timeline.

At reference 209, the first device begins determining sensory events to be output by the devices. As shown in FIG. 2A, the sensory event timelines 204, 206, 208 of the other devices are delayed relative to the first device's timeline 202. This may ensure that there is sufficient time for the devices to receive an indication of the sensory events determined by the first device. For example, delaying the timelines 204, 206, 208 of the other devices may provide sufficient time for the devices to receive an indication of the sensory events and output the events at an appropriate point on the timeline (e.g., to account for network latency). The first device determines sensory events S11, S12, S13, S14, S15 and outputs them using its timeline 202. The other devices receive indications of these sensory events and output the sensory events S11, S12, S13, S14, S15 using their respective timelines 204, 206, 208.

At reference 210, the first device may be commanded to transition from first mode into second mode, and the second device may be commanded to transition from second mode into first mode to begin determining sensory events. As shown in the first device's timeline 202, after receiving the command, the first device outputs an interlude. Segments labeled "Int" are segments of the timeline in which the device outputs an interlude. In the example of FIG. 2, the first device outputs an interlude spanning four segments. As shown in the second device's timeline 204, the second device outputs an interlude spanning the length of two segments. The third and fourth devices may be commanded to begin outputting sensory events determined by the second device instead of the first device. As shown in the third device's timeline 206 and the fourth device's timeline 208, each of the third and fourth devices outputs an interlude spanning three segments.

As illustrated in FIG. 2, the length of the interlude outputted by the first device is longer than the interlude outputted by the third and fourth device. This allows the first device's timeline 202 to: (1) be delayed relative to timeline 204 of the new creator device (i.e., the second device); and (2) align with timelines 206, 208 of the other spectator devices. The lengths of the interludes outputted by the third and fourth device are longer than the interlude output by the second device. This allows the timelines 206, 208 to be delayed relative to the timeline 204 of the new creator device (i.e., the second device).

After the first transition at reference 210, the second device determines sensory events S21, S22, S23, S24, S25 and outputs them using its timeline 204. The other devices receive indications of these events and output them using their respective timelines 202, 206, 208. As shown in FIG. 2, the timelines 202, 206, 208 are delayed relative to the second device's timeline 204 in outputting S21, S22, S23, S24, S25.

At reference number 212, the second device may be commanded to transition from the first mode into the second mode, and the third device may be commanded to transition from the second mode into the first mode. As shown in the second device's timeline 204, after receiving the command, the second device outputs an interlude. In the example of FIG. 2, the second device outputs an interlude spanning four segments. As shown in the third device's timeline 206, the third device outputs an interlude spanning the length of two segments. The first and fourth devices may be commanded to begin outputting sensory events determined by the third device instead of the first device. As shown in the first device's timeline 202 and the fourth device's timeline 208, each of the first and fourth devices outputs an interlude spanning three segments.

After the transition at reference 212, the third device determines sensory events S31, S32, S33, S34, S35 and outputs them using its timeline 206. The other devices receive indications of these events and output them using their respective timelines 202, 204, 208. As shown in FIG. 2, the timelines 202, 204, 208 are delayed relative to the third device's timeline 206 in outputting sensory events S31, S32, S33, S34, S35.

It should be appreciated that the number of segments for each interlude shown in the timelines of FIG. 2 are exemplary. It should be appreciated that the interlude lengths illustrated in FIG. 2 are exemplary. Some embodiments may use different interlude lengths than shown in FIG. 2. For example, a device transitioning from the first mode into the second mode may output an interlude that spans a length of two segments, the device transitioning from the second mode into the first mode may output no interlude, and devices that remain in the second mode through a transition would output an interlude that spans a length of one segment. In some embodiments, the lengths of the interludes outputted by the devices during a transition may be as follows: (1) the interlude of a device transitioning from first mode into second mode is L segments; (2) the interlude of a device transitioning from second mode into first mode is L-2 segments; and (3) the interlude of a device remaining in the second mode is L-1 segments. In some embodiments, a length of a segment may be a length of approximately one sensory event. For example, a length of a segment may be a length of an audio segment output using a timeline.

Figure 3A:
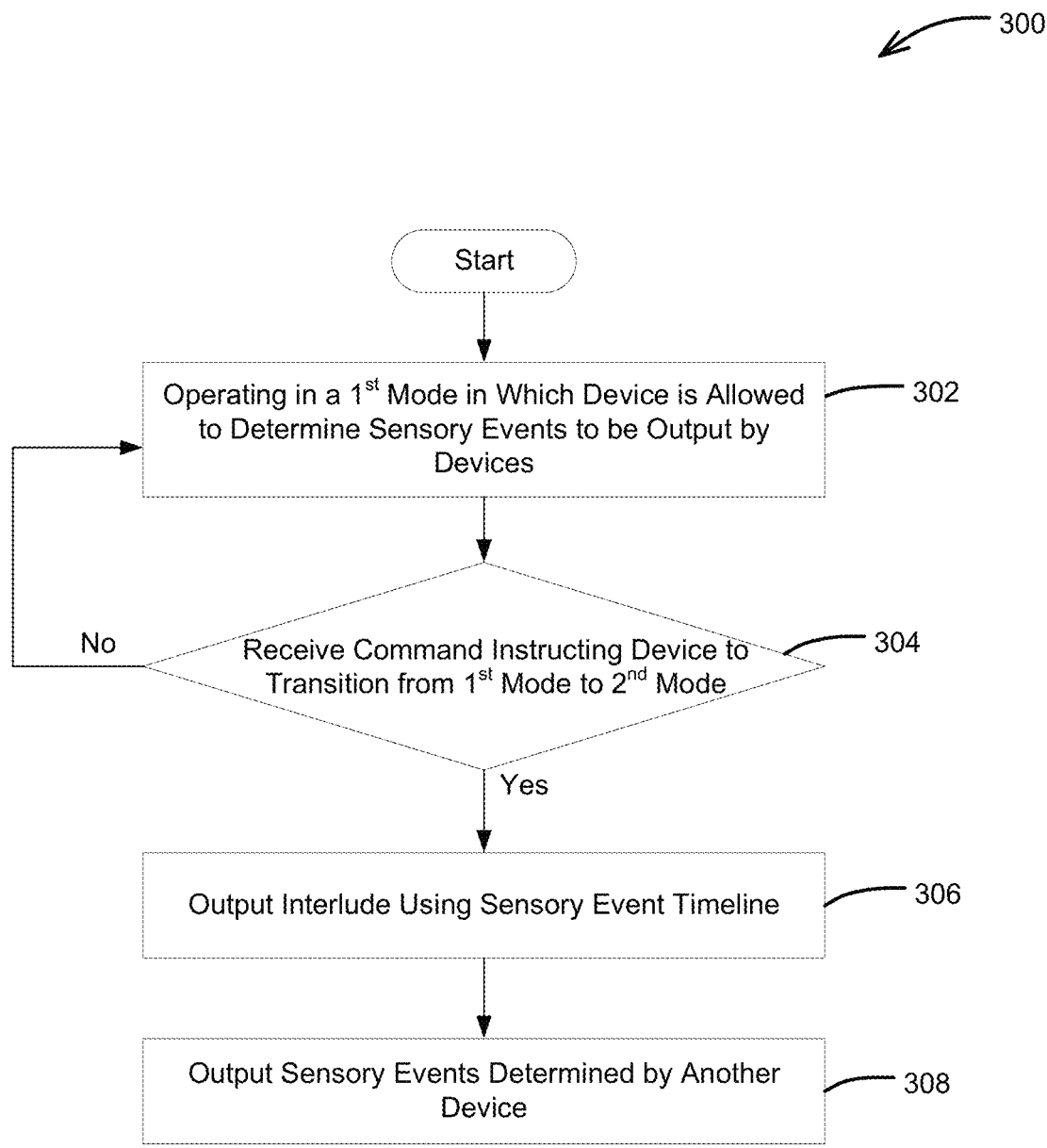
FIG. 3A shows an example process for a device to transition from a first mode in which the device is allowed to determine sensory events to a second mode in which the device is to output sensory events determined by another device, according to some embodiments of the technology described herein.

FIG. 3A shows an example process 300 for a device to transition from a first mode in which the device is allowed to determine sensory events to a second mode in which the device is to output sensory events determined by another device, according to some embodiments of the technology described herein. Process 300 may be performed by one of the devices 104, 106, 108 shown in FIG. 1A. The device may be one of multiple devices that are collaborating to generate sensory content. Each of the devices may have a respective sensory event timeline that the device uses to output sensory events determined by the devices.

Process 300 begins at block 302 where the device performing process 300 is operating in the first mode in which it is allowed to determine sensory events to be output by the devices using their sensory event timelines. Sensory event timelines of the other devices may be delayed relative to the sensory event timeline of the device. This may allow the devices to output the sensory events while mitigating effects of network latency. The device may be configured to transmit an indication of the determined sensory events to the coordination system 102. For example, the device may transmit a message indicating selected sensory event content (e.g., audio data, video data, or other type of sensory data) of the sensory events. In another example, the device may transmit the selected sensory event content itself (e.g., audio files, image files, and/or video files). In some embodiments, the device may transmit the indication of the determined sensory events to the other devices in addition to or instead of the coordination system 102.

Next, at block 304, the device determines whether it has received a command instructing the device to transition from the first mode into the second mode. If the device has not received the command, then process 300 returns to block 302 where the device remains operating in the first mode. If at block 304 the device receives the command, then process 300 proceeds to block 306, where the device outputs an interlude using its sensory event timeline. Examples of interludes and their lengths are described herein. For example, the device may output an audio interlude using its sensory event timeline after outputting the sensory events that it determined. In this example, the audio interlude may include transition sound effects and/or one or more audio segments previously output using the sensory event timeline.

Next, at block 308, the device outputs sensory events determined by another device (i.e., that transitioned into the first mode). The device may be configured to perform the steps of block 308 after performing the step of block 306. The device may output the interlude to delay output of sensory events determined by the new creator device that has transitioned into the first mode. This allows the sensory event timeline of the device performing process 300 to be delayed relative to the sensory event timeline of the new creator device.

Figure 3B:
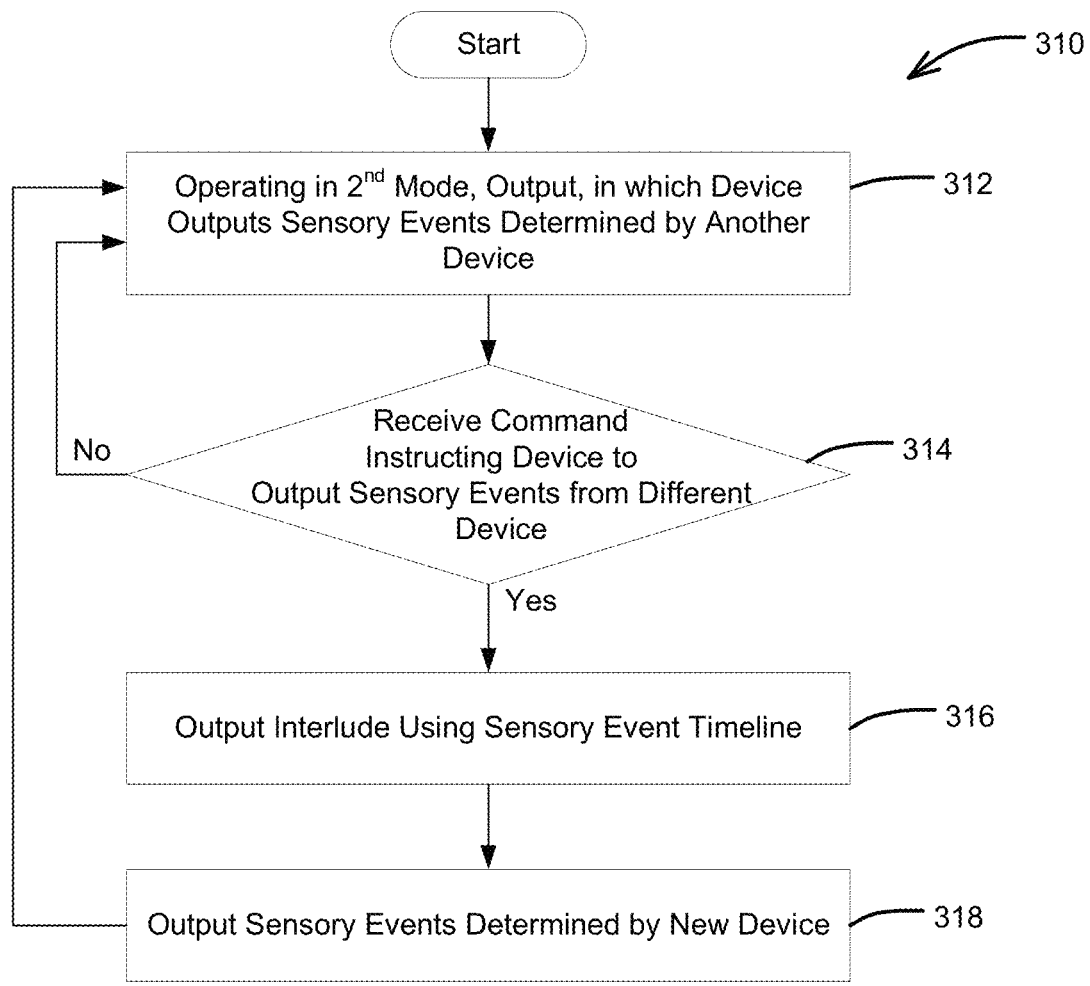
FIG. 3B shows an example process for a device operating in the second mode to transition from outputting sensory events determined by one device to outputting sensory events determined by another device, according to some embodiments of the technology described herein.

FIG. 3B shows an example process 310 for a device operating in the second mode to transition from outputting sensory events determined by one device to outputting sensory events determined by another device, according to some embodiments of the technology described herein. Process 310 may be performed by one of the devices 104, 106, 108 described herein with reference to FIGS. 1A-1C. The device may be one of multiple devices that are collaborating to generate sensory content. Each of the devices may have a respective sensory event timeline that the device uses to output sensory events determined by the devices.

Process 310 begins at block 312, where the device is operating in the second mode in which the device outputs sensory events determined by another one of the devices. The device may be configured to receive an indication of the sensory events determined by the other device. For example, the device may receive a message indicating specific data to use for outputting the sensory events. To illustrate, the device may be executing a video game and receive an indication of data in the video game for the determined sensory events. The device may use the indicated data to output the determined sensory events in the video game. As another example, the device may receive data (e.g., file(s)) including data for the sensory events. The device may output the received data using the sensory event timeline.

Next, process 310 proceeds to block 314, where the device determines whether the device has received a command (e.g., from coordination system 102) instructing the device to output sensory events determined by a different device. If at block 314 the device does not receive the command, then process 310 remains at block 312. If at block 314, the device receives the command, then process 310 proceeds to block 316, where the device outputs an interlude using its sensory event timeline. In some embodiments, the interlude output by the device at block 316 may be shorter than the interlude output by the device performing process 300 at block 306.

Next, process 310 proceeds to block 318, where the device outputs sensory events determined by the new device. The device may be configured to receive an indication of the sensory events determined by the new device operating in the first mode. The device may output the indicated sensory events using its sensory event timeline. For example, the device may output determined audio segments, video segments, images, and/or other sensory events. As shown in FIG. 3B, process 310 may return to block 312 where the device may continue outputting sensory events determined by the creator device until the device receives another command at block 314 instructing the device to output sensory events from a different device.

Figure 3C:
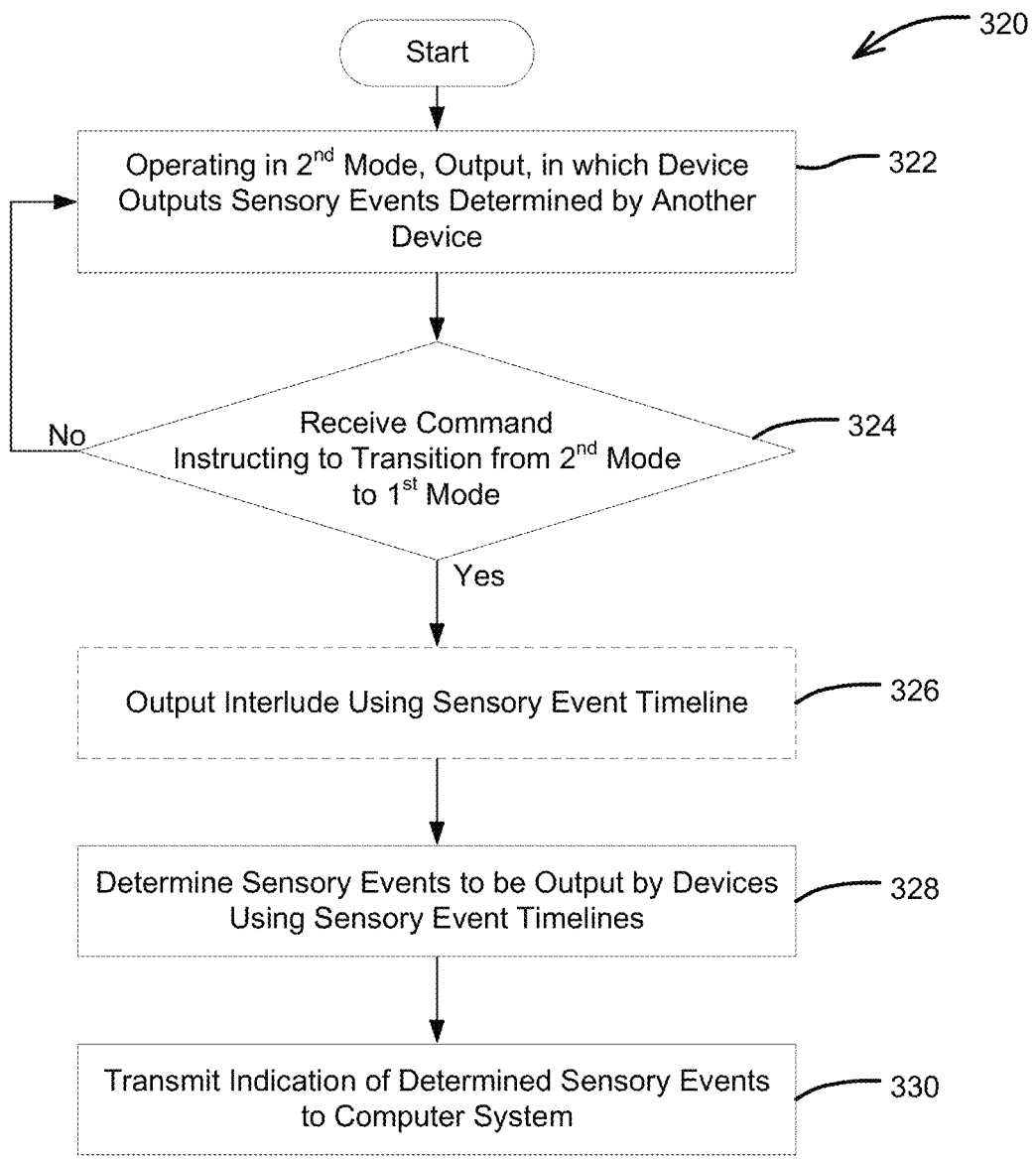
FIG. 3C shows an example process for a device to transition from the second mode to the first mode, according to some embodiments of the technology described herein.

FIG. 3C shows an example process 320 for a device to transition from the second mode to the first mode, according to some embodiments of the technology described herein.

Process 320 may be performed by one of the devices 104, 106, 108 described herein with reference to FIGS. 1A-1C. The device may be one of multiple devices that are collaborating to generate sensory content. Each of the devices may have a respective sensory event timeline that the device uses to output sensory events determined by the devices.

Process 320 begins at block 322, where the device performing process 320 is operating in the second mode in which it is outputting sensory events determined by another device. The device may output sensory events as described at block 312 described herein with reference to FIG. 3B.

Next, process 322 proceeds to block 324, where the device determines whether it has received a command (e.g., from coordination system 102) instructing the device to transition from the second mode into the first mode. If the device determines that it has not received the command, then process 320 returns to block 322 where the device continues to output sensory events determined by the other device. If at block 324 the device determines that it has received a command to transition from the second mode into the first mode, then process 320 proceeds to block 326, where the device outputs an interlude using its sensory event timeline. In some embodiments, the interlude may be shorter than the interlude outputted at block 316 of process 310 and shorter than the interlude outputted at block 306 of process 300. Example lengths of the interludes are described herein. As indicated by the dashed lines of block 326, in some embodiments, the device may not output any interlude. In such embodiments, process 320 may proceed to block 328 without performing the steps of block 326.

Next, process 320 proceeds to block 328, where the device determines sensory events to be output by devices using their sensory event timelines. The device may be configured to determine sensory content as described with reference to the sensory event determination component 104A of FIG. 1B. For example, the device may determine sensory event based on input provided by a user selecting a sensory event from a possible set of sensory events (e.g., audio segments to output in a video game). In another example, the device may programmatically determine the sensory events.

Next, process 320 proceeds to block 330, where the device transmits an indication of the determined sensory events to a computer system. The device may be configured to transmit the indication of the determined sensory events to a coordination system (e.g., coordination system 102) for transmission to the other devices. For example, the device may transmit a message indicating data for the determined sensory events. In another example, the device may transmit sensory event data that the devices may output.

Although in the example embodiments of FIGS. 3A, 3B, 3C the device transitions are initiated based on receiving a command (as described herein with reference to blocks 304, 314, 324), in some embodiments, the device itself may determine to make a transition. The commands may be generated a device performing any of processes 300, 310, 320, or another one of the devices that is configured to determine sensory events (e.g., instead of a coordination system 102). For example, software instructions stored on the device may generate a command to cause a transition. Example techniques that may be used by a device to transition are described herein.

Figure 4:
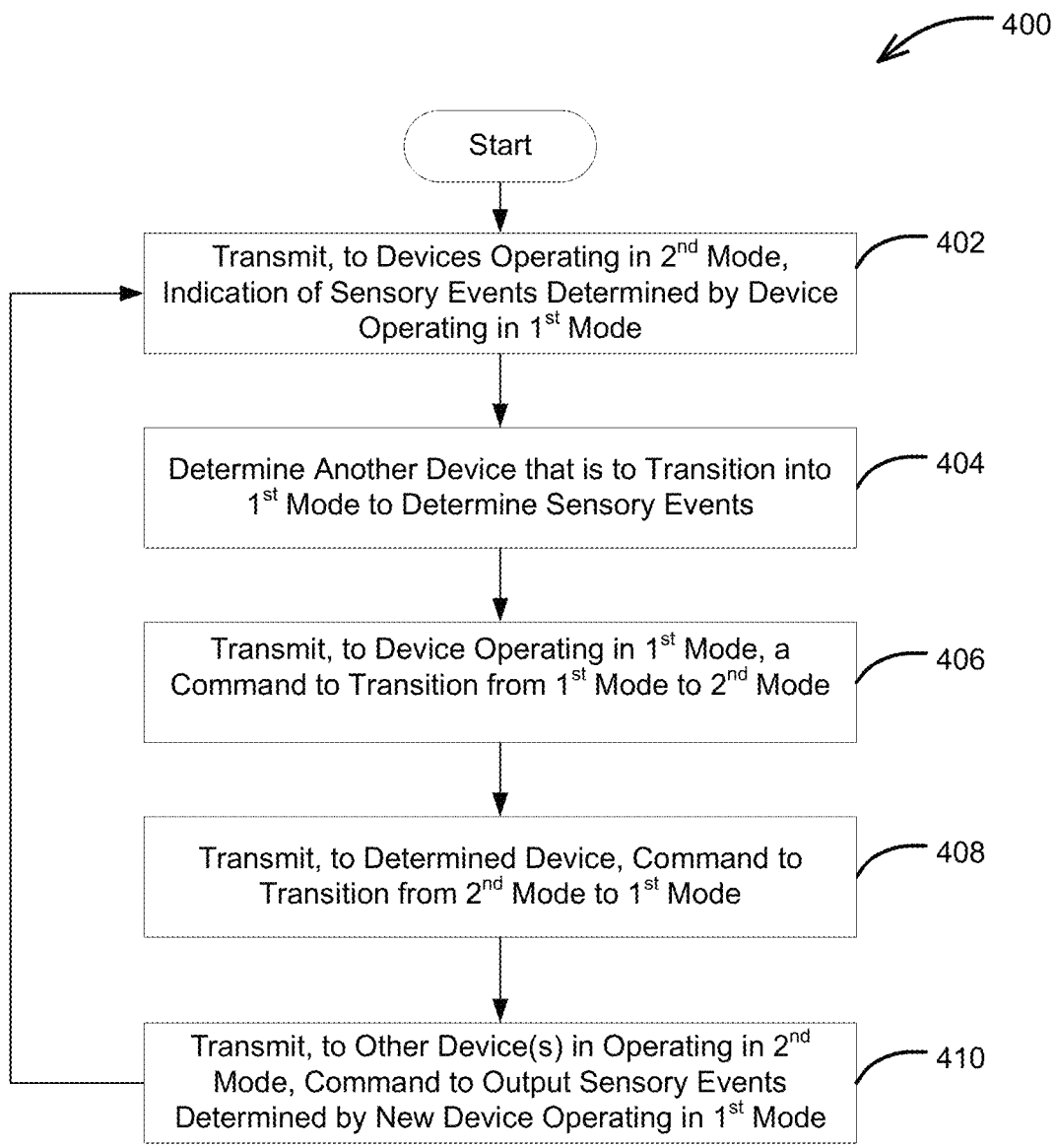
FIG. 4 shows an example process for a computer system to coordinate transitions of devices between a first mode and a second mode, according to some embodiments of the technology described herein.

FIG. 4 shows an example process 400 for a computer system to coordinate transitions of devices between a first mode and a second mode, according to some embodiments of the technology described herein. Process 400 may be performed by coordination system 102 described herein with reference to FIGS. 1A-1C. Process 400 may be performed by the coordination system 102 to coordinate sensory event timelines of the devices 104, 106, 108 during transitions of devices between the first mode and the second mode. As an illustrative example, the coordination system 102 may be a video game server that is coordinating transitions between the first mode and the second mode for the devices 104, 106, 108.

Process 400 begins at block 402, where the system transmits, to devices operating in the second mode ("spectator devices"), an indication of sensory events determined by a device operating in the first mode ("creator device"). The device may be configured to receive an indication of the sensory events determined by the creator device, and transmit an indication of the sensory events to the spectator devices. In some embodiments, the system may be configured to transmit an indication of sensory event data stored on the device to use for outputting the sensory events. For example, the system may transmit a message indicating data in a video game that is to be used to output determined sensory events. In some embodiments, the system may be configured to transmit sensory event data. For example, the system may transmit a file storing sensory event data to be output by devices using their sensory event timelines.

Next, process 400 proceeds to block 404, where the system determines that another device is to transition into the first mode and become the creator device, while the previous creator device is to transition into the second mode and be a spectator device. In some embodiments, the system may be configured to make the determination by determining that an amount of time that the current creator device has been in the first mode has reach a threshold amount of time. The threshold amount of time may be 30 seconds, 1 minute, 2 minutes, 3 minutes, 4 minutes, 5 minutes, 10 minutes, 20 minutes, 30 minutes, 60 minutes, or another suitable amount of time. In some embodiments, the system may be configured to make the determination based on user input. For example. The system may determine that another device is to become the creator device based on votes from users of the devices. In some embodiments, the system may be configured to make the determination based on scores associated with the different devices. For example, the system may determine that another device is to become the creator device based on scores in a video game.

Next, process 400 proceeds to block 406, where the system transmits, to the device operating in the first mode, a command instructing the device to transition into the second mode. The command may cause the device to perform process 300 described herein with reference to FIG. 3A to transition from the first mode into the second mode. In some embodiments, the system may be configured to transmit the command through a communication network such as the Internet. For example, the system may transmit a network packet including a message instructing the device to transition from the first mode into the second mode. In some embodiments, the command may include software instructions that, when executed by the device, cause the device to transition from the first mode into the second mode.

Next, process 400 proceeds to block 408, where the system transmits a command to a device instructing the device to transition from the second mode into the first mode. The device may be the device that the system determined at block 404 as the new creator device. The command may cause the device to perform process 320 described herein with reference to FIG. 3C to transition from the second mode into the first mode. In some embodiments, the system may be configured to transmit the command through a communication network such as the Internet. For example, the system may transmit a network packet including a message instructing the device to transition from the second mode into the first mode. In some embodiments, the command may include software instructions that, when executed by the device, cause the device to transition from the second mode into the first mode.

Next, process 400 proceeds to block 410, where the system transmits a command to device(s) that were already operating in the second mode instructing the devices to output sensory events determined by the new device operating in the first mode (i.e., the new creator device). The command may cause each of the device(s) to perform process 310 described herein with reference to FIG. 3B to transition from outputting sensory events determined by one device to sensory events determined by the new creator device. In some embodiments, the system may be configured to transmit the command through a communication network such as the Internet. For example, the system may transmit a network packet including a message instructing the device. In some embodiments, the command may include software instructions that, when executed by the device, cause the device to output sensory events determined by the new creator device instead of the previous creator device.

Example Computer System

Figure 5:
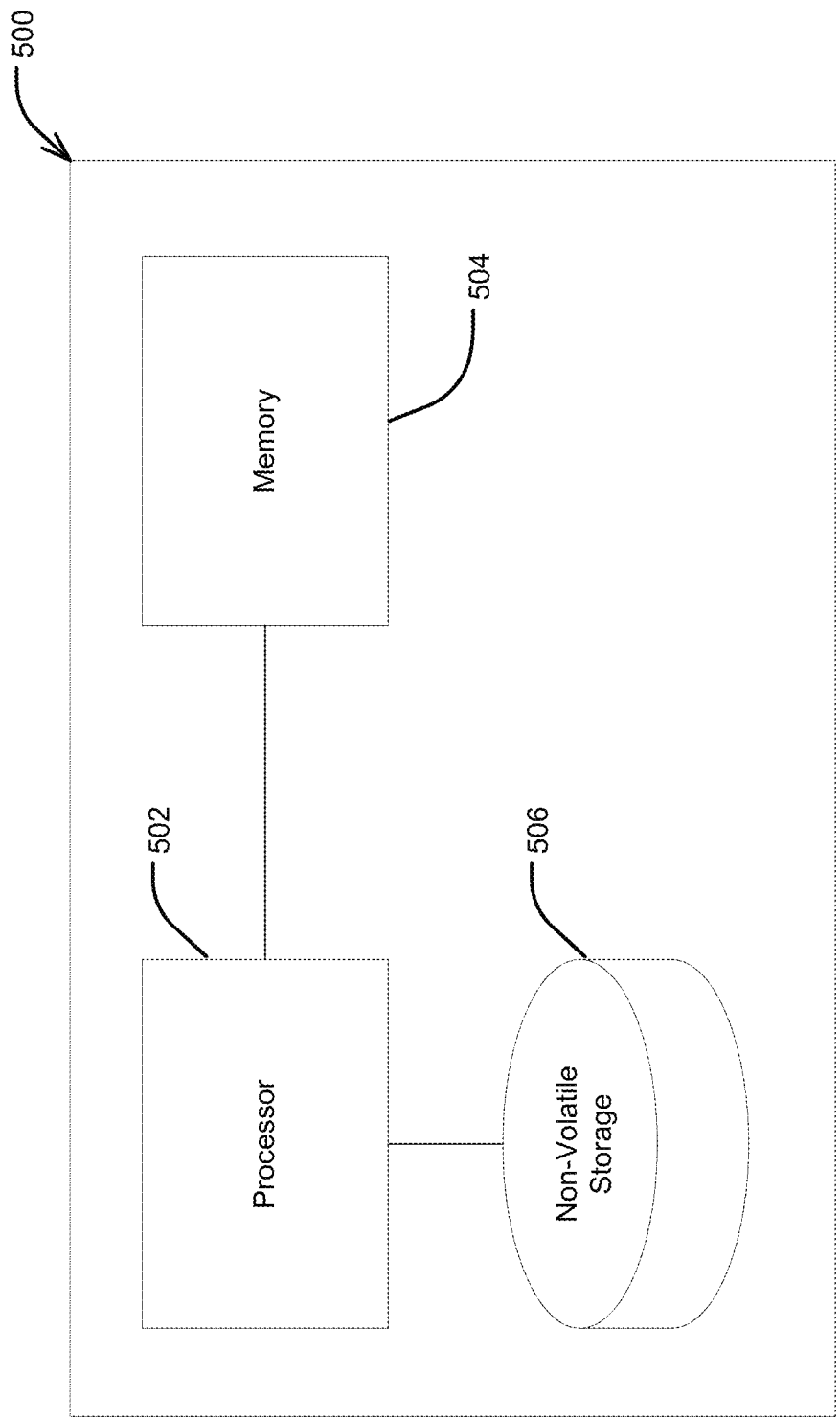
FIG. 5 is a block diagram of an example computing system that may be used to implement some embodiments of the technology described herein.

FIG. 5 shows a block diagram of an example computer system 500 that may be used to implement embodiments of the technology described herein. The computing device 500 may include one or more computer hardware processors 502 and non-transitory computer-readable storage media (e.g., memory 504 and one or more non-volatile storage devices 506). The processor(s) 502 may control writing data to and reading data from (1) the memory 504; and (2) the non-volatile storage device(s) 506. To perform any of the functionality described herein, the processor(s) 502 may execute one or more processor-executable instructions stored in one or more non-transitory computer-readable storage media (e.g., the memory 504), which may serve as non-transitory computer-readable storage media storing processor-executable instructions for execution by the processor(s) 502.

The terms "program" or "software" are used herein in a generic sense to refer to any type of computer code or set of computer-executable instructions that can be employed to program a computer or other processor to implement various aspects of the technology as described above. Additionally, it should be appreciated that according to one aspect of this embodiment, one or more computer programs that when executed perform methods of the technology described herein need not reside on a single computer or processor, but may be distributed in a modular fashion amongst a number of different computers or processors to implement various aspects of the technology described herein.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the technology described herein may be embodied as a method, of which examples are provided herein. The acts performed as part of any of the methods may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by an "actor" or a "user". It should be appreciated that an "actor" or a "user" need not be a single individual, and that in some embodiments, actions attributable to an "actor" or a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Various aspects are described in this disclosure, which include, but are not limited to, the following aspects:

1. A method of coordinating a sensory event timeline of a device of a plurality of devices with sensory event timelines of one or more other devices of the plurality of devices, the plurality of devices configured to determine sensory events for output using sensory event timelines of the plurality of devices, the method comprising: using a processor of the device to perform: operating in a first mode in which the device is allowed to determine sensory events to be output by the plurality of devices using their sensory event timelines; determining to transition from the first mode to a second mode in which the device is to output, using the sensory event timeline, sensory events determined by a first one of the one or more other devices; and after determining to transition from the first mode to the second mode: outputting, using the sensory event timeline, a first interlude to delay output of the sensory events determined by the first device; and after outputting the first interlude, outputting, using the sensory event timeline, the sensory events determined by the first device.

2. The method of aspect 1, further comprising: while operating in the second mode, determining to output sensory events determined by a second device of the one or more other devices instead of the first device; and after determining to output sensory events determined by the second device: outputting, using the sensory event timeline, a second interlude that is shorter than the first interlude to delay output of the sensory events determined by the second device; and after outputting the second interlude, outputting, using the sensory event timeline, the sensory events determined by the second device.

3. The method of aspect 2, further comprising: while operating in the second mode, determining to transition from the second mode back to the first mode in which the device is allowed to determine the sensory events to be output by the plurality of devices using their sensory event timelines; and after determining to transition from the second mode back to the first mode: outputting, using the sensory event timeline, the sensory events determined by the device.

4. The method of aspect 3, further comprising, after determining to transition from the second mode back to the first mode and prior to outputting the sensory events determined by the device: outputting, using the sensory event timeline, a third interlude that is shorter than the first interlude and the second interlude to delay output of the sensory events determined by the device.

5. The method of aspect 4, wherein a difference between a length of the first interlude and a length of the third interlude is approximately two sensory events.

6. The method of any of aspects 2-4, wherein a difference between a length of the first interlude and a length of the second interlude is approximately one sensory event.

7. The method of asp any of aspects 1-6, wherein the first interlude comprises one or more sensory events that are the same as a final sensory event of a set of sensory events determined by the device.

8. The method of any of aspects 1-7, wherein the sensory event timeline comprises an audio timeline and the second set of sensory events comprises a set of audio segments.

9. The method of aspect 8, wherein the first interlude comprises an audio stutter transition and/or an audio segment previously outputted using the sensory event timeline.

10. The method of any of aspects 1-9, wherein the sensory event timeline comprises a video timeline and the second set of sensory events comprises a set of video segments.

11. The method of any of aspects 1-10, further comprising, after outputting the first interlude using the sensory event timeline, transmitting an indication of the sensory events determined by the device to the computer system for distribution to the one or more other devices.

12. The method of any of aspects 1-11, further comprising, while operating in the first mode: determining the sensory events to be output by the plurality of devices using their sensory event timelines; and outputting, using the sensory event timeline, the sensory events determined by the device.

13. The method of aspect 12, wherein the outputting of the first interlude is performed after outputting the sensory events determined by the device.

14. The method of any of aspects 1-13, wherein determining to transition from the first mode to a second mode comprises receiving a command from a computer system instructing the device to transition from the first mode into the second mode.

15. A device among a plurality of devices configured to determine sensory events for output using sensory event timelines of the plurality of devices, the device comprising: a processor; and a non-transitory computer-readable storage medium storing instructions that, when executed by the processor, cause the processor to perform: operating in a first mode in which the device is allowed to determine sensory events to be output by the plurality of devices using their sensory event timelines; determining to transition from the first mode to a second mode in which the device is to output, using a sensory event timeline of the device, sensory events determined by a first device of one or more other devices of the plurality of devices; and after determining to transition from the first mode to the second mode: outputting, using the sensory event timeline, a first interlude to delay output of the sensory events determined by the first device; and after outputting the first interlude, outputting, using the sensory event timeline, the sensory events determined by the first device.

16. The device of aspect 15, wherein the instructions further cause the processor to perform: while operating in the second mode, determining to output sensory events determined by a second device of the one or more other devices instead of the first device; and after determining to output sensory events determined by the second device: outputting, using the sensory event timeline, a second interlude that is longer than the first interlude to delay output of the sensory events determined by the second device; and after outputting the second interlude, outputting, using the sensory event timeline, the sensory events determined by the second device.

17. The device of aspect 16, wherein the instructions further cause the processor to perform: while operating in the second mode, determining to transition from the second mode back to the first mode in which the device is allowed to determine the sensory events to be output by the plurality of devices using their sensory event timelines; and after determining to transition from the second mode back to the first mode: outputting, using the sensory event timeline, the sensory events determined by the device.

18. The device of aspect 17, wherein the instructions further cause the processor to perform, after determining to transition from the second mode back to the first mode and prior to outputting the sensory events determined by the device: outputting, using the sensory event timeline, a third interlude that is shorter than the first interlude and the second interlude to delay output of the sensory events determined by the device.

19. The device of aspect 18, wherein a difference between a length of the first interlude and a length of the third interlude is approximately two sensory events.

20. The device of any of aspects 16-19, wherein a difference between a length of the first interlude and a length of the second interlude is approximately one sensory event.

21. A non-transitory computer-readable storage medium storing instructions that, when executed by a processor, cause the processor to perform a method of coordinating a sensory event timeline of a device of a plurality of devices with sensory event timelines of one or more other devices of the plurality of devices, the plurality of devices configured to determine sensory event events for output using sensory event timelines of the plurality of devices, the method comprising: operating in a first mode in which the device is allowed to determine sensory events to be output by the plurality of devices using their sensory event timelines; determining to transition from the first mode to a second mode in which the device is to output, using the sensory event timeline, sensory events determined by a first one of the one or more other devices; and after determining to transition from the first mode to the second mode: outputting, using the sensory event timeline, a first interlude to delay output of the sensory events determined by the first device; and after outputting the first interlude, outputting, using the sensory event timeline, the sensory events determined by the first device.

22. A system for coordinating sensory event timelines of a plurality of devices, the plurality of devices configured to determine sensory events for output using the sensory event timelines, the system comprising: a processor; and a non-transitory computer-readable storage medium storing instructions that, when executed by the processor, cause the processor to perform: transmitting, to a first device, a first command instructing the first device to transition from a first mode, in which the first device is allowed to determine sensory events to be output by the plurality of devices using their sensory event timelines, to a second mode in which the first device is to output sensory events determined by a second device of the plurality of devices, wherein the first command causes the first device to perform: outputting, using a first sensory event timeline of the first device, a first interlude to delay output of the sensory events determined by the second device; and after outputting the first interlude, outputting, using the first sensory event timeline, the sensory events determined by the second device.

23. The system of aspect 22, wherein the instructions further cause the processor to perform: transmitting, to the second device, a second command instructing the second device to transition from the second mode into the first mode in which the second device is allowed to determine sensory events to be output by the plurality of devices using their sensory event timelines, wherein the second command causes the second device to perform: outputting, using a second sensory event timeline of the second device, the sensory events determined by the second device.

24. The system of aspect 23, wherein the instructions further cause the processor to perform: transmitting, to a third one of the plurality of devices operating in the second mode, a third command instructing the third device to output the sensory events determined by the second device instead of the sensory events determined by the first device, wherein the third command causes the third device to perform: outputting, using a third sensory event timeline of the third device, a second interlude that is shorter than the first interlude to delay output of the sensory events determined by the second device; and after outputting the second interlude, outputting, using the third sensory event timeline, the sensory events determined by the second device.

The invention claimed is:

1. A method of coordinating a sensory event timeline of a device of a plurality of devices with sensory event timelines of one or more other devices of the plurality of devices, the plurality of devices configured to determine sensory events for output using sensory event timelines of the plurality of devices, the method comprising:
using a processor of the device to perform:
operating in a first mode in which the device is allowed to determine sensory events to be output by the plurality of devices using their sensory event timelines;
determining to transition from the first mode to a second mode in which the device is to output, using the sensory event timeline, sensory events determined by a first one of the one or more other devices; and
after determining to transition from the first mode to the second mode:
outputting, using the sensory event timeline, a first interlude to delay output of the sensory events determined by the first device, wherein the first interlude reorients the sensory event timeline of the device to be delayed relative to a sensory event timeline of the first device; and
after outputting the first interlude, outputting, using the sensory event timeline, the sensory events determined by the first device.

2. A method of coordinating a sensory event timeline of a device of a plurality of devices with sensory event timelines of one or more other devices of the plurality of devices, the plurality of devices configured to determine sensory events for output using sensory event timelines of the plurality of devices the method comprising:
using a processor of the device to perform:
operating in a first mode in which the device is allowed to determine sensory events to be output by the plurality of devices using their sensory event timelines;
determining to transition from the first mode to a second mode in which the device is to output, using the sensory event timeline, sensory events determined by a first one of the one or more other devices;
after determining to transition from the first mode to the second mode:
outputting, using the sensory event timeline, a first interlude to delay output of the sensory events determined by the first device; and
after outputting the first interlude, outputting, using the sensory event timeline, the sensory events determined by the first device;
while operating in the second mode, determining to output sensory events determined by a second device of the one or more other devices instead of the first device; and
after determining to output sensory events determined by the second device:
outputting, using the sensory event timeline, a second interlude that is shorter than the first interlude to delay output of the sensory events determined by the second device; and
after outputting the second interlude, outputting, using the sensory event timeline, the sensory events determined by the second device.

3. The method of claim 2, further comprising:
while operating in the second mode, determining to transition from the second mode back to the first mode in which the device is allowed to determine the sensory events to be output by the plurality of devices using their sensory event timelines; and
after determining to transition from the second mode back to the first mode:
outputting, using the sensory event timeline, the sensory events determined by the device.

4. The method of claim 3, further comprising, after determining to transition from the second mode back to the first mode and prior to outputting the sensory events determined by the device:
outputting, using the sensory event timeline, a third interlude that is shorter than the first interlude and the second interlude to delay output of the sensory events determined by the device.

5. The method of claim 4, wherein a difference between a length of the first interlude and a length of the third interlude is approximately two sensory events.

6. The method of claim 2, wherein a difference between a length of the first interlude and a length of the second interlude is approximately one sensory event.

7. The method of claim 1, wherein the first interlude comprises one or more sensory events that are the same as a final sensory event of a set of sensory events determined by the device.

8. The method of claim 1, wherein the sensory event timeline comprises an audio timeline and the second set of sensory events comprises a set of audio segments.

9. The method of claim 8, wherein the first interlude comprises an audio stutter transition and/or an audio segment previously outputted using the sensory event timeline.

10. The method of claim 1, wherein the sensory event timeline comprises a video timeline and the second set of sensory events comprises a set of video segments.

11. The method of claim 1, further comprising, after outputting the first interlude using the sensory event timeline, transmitting an indication of the sensory events determined by the device to the computer system for distribution to the one or more other devices.

12. The method of claim 1, further comprising, while operating in the first mode:
   determining the sensory events to be output by the plurality of devices using their sensory event timelines; and
   outputting, using the sensory event timeline, the sensory events determined by the device.

13. The method of claim 12, wherein the outputting of the first interlude is performed after outputting the sensory events determined by the device.

14. The method of claim 1, wherein determining to transition from the first mode to a second mode comprises receiving a command from a computer system instructing the device to transition from the first mode into the second mode.

15. A device among a plurality of devices configured to determine sensory events for output using sensory event timelines of the plurality of devices, the device comprising:
   a processor; and
   a non-transitory computer-readable storage medium storing instructions that, when executed by the processor, cause the processor to perform:
      operating in a first mode in which the device is allowed to determine sensory events to be output by the plurality of devices using their sensory event timelines;
      determining to transition from the first mode to a second mode in which the device is to output, using a sensory event timeline of the device, sensory events determined by a first device of one or more other devices of the plurality of devices; and
      after determining to transition from the first mode to the second mode:
         outputting, using the sensory event timeline, a first interlude to delay output of the sensory events determined by the first device, wherein the first interlude reorients the sensory event timeline of the device to be delayed relative to a sensory event timeline of the first device; and
         after outputting the first interlude, outputting, using the sensory event timeline, the sensory events determined by the first device.

16. A device among a plurality of devices configured to determine sensory events for output using sensory event timelines of the plurality of devices, the device comprising:
   a processor; and
   a non-transitory computer-readable storage medium storing instructions that, when executed by the processor, cause the processor to perform:
      operating in a first mode in which the device is allowed to determine sensory events to be output by the plurality of devices using their sensory event timelines;
      determining to transition from the first mode to a second mode in which the device is to output, using a sensory event timeline of the device, sensory events determined by a first device of one or more other devices of the plurality of devices;
      after determining to transition from the first mode to the second mode:
         outputting, using the sensory event timeline, a first interlude to delay output of the sensory events determined by the first device; and
         after outputting the first interlude, outputting, using the sensory event timeline, the sensory events determined by the first device;
      while operating in the second mode, determining to output sensory events determined by a second device of the one or more other devices instead of the first device; and
      after determining to output sensory events determined by the second device:
         outputting, using the sensory event timeline, a second interlude that is longer than the first interlude to delay output of the sensory events determined by the second device; and
         after outputting the second interlude, outputting, using the sensory event timeline, the sensory events determined by the second device.

17. The device of claim 16, wherein the instructions further cause the processor to perform:
   while operating in the second mode, determining to transition from the second mode back to the first mode in which the device is allowed to determine the sensory events to be output by the plurality of devices using their sensory event timelines; and
   after determining to transition from the second mode back to the first mode:
      outputting, using the sensory event timeline, the sensory events determined by the device.

18. The device of claim 17, wherein the instructions further cause the processor to perform, after determining to transition from the second mode back to the first mode and prior to outputting the sensory events determined by the device:
   outputting, using the sensory event timeline, a third interlude that is shorter than the first interlude and the second interlude to delay output of the sensory events determined by the device.

19. The device of claim 18, wherein a difference between a length of the first interlude and a length of the third interlude is approximately two sensory events.

20. The device of claim 16, wherein a difference between a length of the first interlude and a length of the second interlude is approximately one sensory event.

21. A non-transitory computer-readable storage medium storing instructions that, when executed by a processor, cause the processor to perform a method of coordinating a sensory event timeline of a device of a plurality of devices with sensory event timelines of one or more other devices of the plurality of devices, the plurality of devices configured to determine sensory event events for output using sensory event timelines of the plurality of devices, the method comprising:

operating in a first mode in which the device is allowed to determine sensory events to be output by the plurality of devices using their sensory event timelines;

determining to transition from the first mode to a second mode in which the device is to output, using the sensory event timeline, sensory events determined by a first one of the one or more other devices; and after determining to transition from the first mode to the second mode:

outputting, using the sensory event timeline, a first interlude to delay output of the sensory events determined by the first device, wherein the first interlude reorients the sensory event timeline of the device to be delayed relative to a sensory event timeline of the first device; and after outputting the first interlude, outputting, using the sensory event timeline, the sensory events determined by the first device.

22. A system for coordinating sensory event timelines of a plurality of devices, the plurality of devices configured to determine sensory events for output using the sensory event timelines, the system comprising:

a processor; and a non-transitory computer-readable storage medium storing instructions that, when executed by the processor, cause the processor to perform:

transmitting, to a first device, a first command instructing the first device to transition from a first mode, in which the first device is allowed to determine sensory events to be output by the plurality of devices using their sensory event timelines, to a second mode in which the first device is to output sensory events determined by a second device of the plurality of devices, wherein the first command causes the first device to perform:

outputting, using a first sensory event timeline of the first device, a first interlude to delay output of the sensory events determined by the second device, wherein the first interlude reorients the sensory event timeline of the device to be delayed relative to a sensory event timeline of the first device; and after outputting the first interlude, outputting, using the first sensory event timeline, the sensory events determined by the second device.

23. The system of claim 22, wherein the instructions further cause the processor to perform:

transmitting, to the second device, a second command instructing the second device to transition from the second mode into the first mode in which the second device is allowed to determine sensory events to be output by the plurality of devices using their sensory event timelines, wherein the second command causes the second device to perform:

outputting, using a second sensory event timeline of the second device, the sensory events determined by the second device.

24. The system of claim 23, wherein the instructions further cause the processor to perform:

transmitting, to a third one of the plurality of devices operating in the second mode, a third command instructing the third device to output the sensory events determined by the second device instead of the sensory events determined by the first device, wherein the third command causes the third device to perform:

outputting, using a third sensory event timeline of the third device, a second interlude that is shorter than the first interlude to delay output of the sensory events determined by the second device; and after outputting the second interlude, outputting, using the third sensory event timeline, the sensory events determined by the second device.

* * * * *